H. A. SCHULTZ.
CHUCK.
APPLICATION FILED APR. 9, 1914.

1,130,768.

Patented Mar. 9, 1915.

Witnesses:

Inventor
Herman A. Schultz
by Palmer & Palmer
Attys

UNITED STATES PATENT OFFICE.

HERMAN A. SCHULTZ, OF CHICAGO, ILLINOIS, ASSIGNOR TO HANNIFIN MANUFACTURING CO., OF CHICAGO, ILLINOIS, A CORPORATION OF ILLINOIS.

CHUCK.

1,130,768.  Specification of Letters Patent.  Patented Mar. 9, 1915.

Application filed April 9, 1914. Serial No. 830,851.

*To all whom it may concern:*

Be it known that I, HERMAN A. SCHULTZ, a citizen of the United States, residing at Chicago, in the county of Cook and State of Ilinois, have invented certain new and useful Improvements in Chucks, of which the following is a specification.

This invention relates to certain improvements in chucks, and has particular reference to such as are designed to be operated by an elastic medium under pressure.

In the present invention, I have sought to provide a positive and effective means for forcing the jaws together; to arrange each of the jaws independently adjustable with respect to the axis of the chuck, as well as adjustable in unison with respect to the remaining jaws; and to provide for a variation in the range of movement within predetermined limits.

The invention further consists in the features of construction and combination of parts as hereinafter described and claimed.

Figure 1:
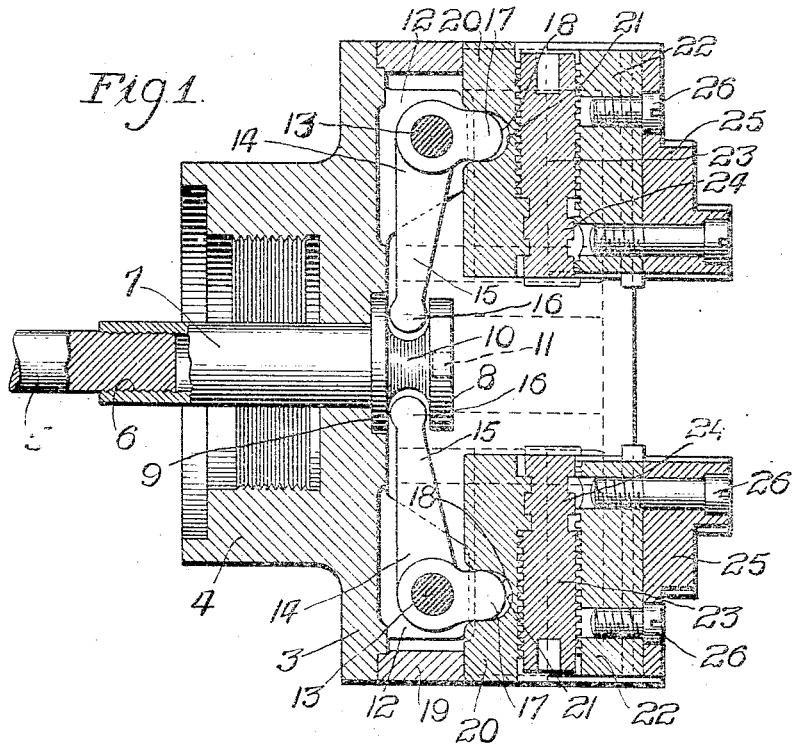
Figure 2:
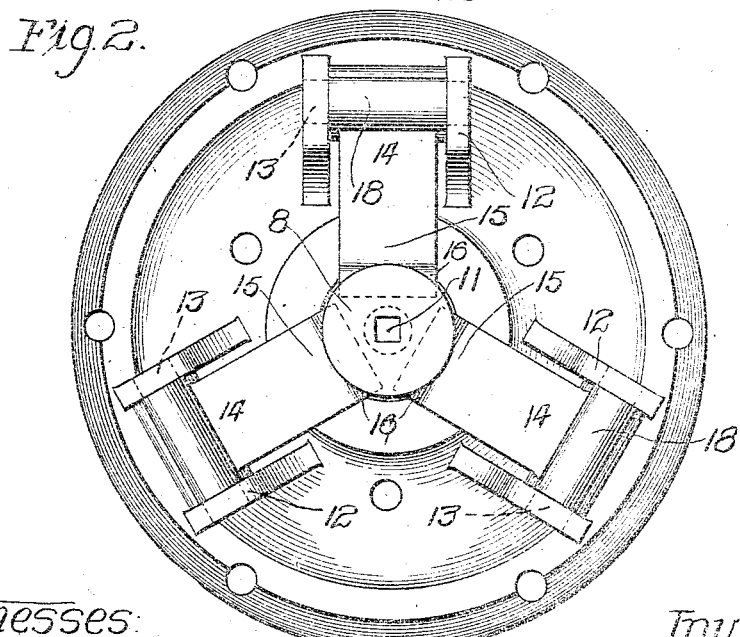

In the drawings: Figure 1 is a cross section taken through a chuck embodying the present invention, the device being represented as employing two oppositely opposed jaws; and Fig. 2 is an elevation of a similar chuck embodying three jaws, the chuck being shown with the jaws removed from the face plate.

As will appear from the figures, in my invention, I utilize a face plate 3, the rear end of which is formed with an interiorly threaded boss 4 arranged to engage with the head of a lathe (not shown) to be fastened thereupon. The movement of the jaws in the present chuck I contemplate effecting by an elastic medium under pressure working through suitable piston mechanism located at the end of the lathe. Power from the piston mechanism is transmitted to the chuck by means of a rod or shaft 5 formed with a threaded end 6.

Passing through the face plate is a stub shaft 7 formed at its outer end with a threaded socket in which the end of the shaft 5 may engage. The inner end of the stub shaft is formed to provide an enlarged head 8, the rear portion of which may seat within a recess 9 on the inner side of the face plate, the said head being further shaped to provide an annular groove 10, as best shown in Fig. 1. A socket 11 is provided centrally in the head 8, which in Fig. 2 is represented as square to facilitate the engagement of a socket wrench therewith.

The inner face of the face plate 3 is provided with ears or lugs 12 between certain of which pins 13 are mounted each of which serves as a pivot about which a bell crank 14 may move. In Fig. 1, these cranks are shown to possess each a long arm 15, the end 16 of which is rounded to engage with a minimum of play or friction within the annular groove 10 of the head 8, and with a short arm 17 the end 18 of which is also rounded.

The face plate is arranged to carry the chuck body 19, within which jaws are mounted capable of moving in a radial direction. These jaws each comprise an inner member 20 slidably secured to the body of the chuck, the inner face of which jaw is grooved or channeled as at 21 to receive therein the end 18 of the bell crank; and an outer member 22 adjustably secured to the inner jaw member as by means of the threaded stem 23. Through the medium of an annular shoulder 24 the stem 23 maintains a fixed relation to the inner jaw member and rotation of said stem insures a relative movement of the outer jaw member. As is usual in chucks of this type, false jaws 25 are provided on the working side of the chuck, being secured in position through the medium of screws 26.

It is apparent, from the foregoing description, that when the piston mechanism is properly utilized the rod 5 will be advanced, whereupon the long arms of the bell cranks 14 are swung forwardly in unison. This movement may be limited in any one of several ways; as a convenient stop for such movement I have designed the forward face of each of the bell cranks so that it may meet substantially squarely with the rear face of the inner jaw member, whereby further forward movement of the bell cranks is prevented. The extreme rearward movement is, of course, determined by engagement of the rear portion of the head 8 within the recess 9 formed on the inner side of the face plate. In certain cases, however, it may be desirable to limit or change the range of movements of the jaws, and to this end a socket wrench may engage with a head 8 of the stub shaft 6 to rotate the same and thereby establish a different relative locking position with the rod 5. It is, of course, manifest that the movement of the long arm on each of the bell cranks is in a relatively longitudinal direction, the jaws being moved inwardly or outwardly in a direction which is radial to the axis of the chuck.

The lever principle utilized to move the jaws in the present device is capable of being applied so as to establish almost any desired ratio between the forces exerted at the power and weight ends of the bell crank. In a construction of chuck such as is illustrated, where the chuck body may be removed from the face plate, leaving only the bell cranks in proper relation with the stub shaft, it is possible to substitute new and different levers wherein the ratio between the acting forces will be changed, so that the power applied as compared to the resulting movements, as well as the range of movement of the jaws, will be wholly different. It is manifest that in certain classes of work such possibilities of adjustment are a highly desirable end.

It is obvious that, in the invention disclosed, the jaws will always be moved toward or farther from each other at equal speeds, thus insuring a centering of the work held thereby. If for any reason the jaws should become decentered, correction may be made through adjustment of one of the threaded stems 23, so as to bring the work into the axial line of the chuck. It is manifest that the principle utilized in my invention is applicable to chucks having two or more jaws, and for the better illustration of this I have represented in Fig. 1 two jaws, while in Fig. 2, three jaws are shown, and more might be employed, if desired.

I claim:

1. In a chuck, the combination of radially movable jaws, levers mounted within the chuck each having angularly disposed arms one of which is arranged to engage with one of said jaws, and a member in engagement with the other arm of each of said levers, and longitudinally movable within the chuck, whereby said jaws may be caused to move radially and in unison, said jaws coöperating with the member-engaging arm of each of said levers to positively limit the swinging movement thereof in one direction, substantially as described.

2. In a chuck, the combination of radially movable jaws, levers mounted within the chuck each having angularly disposed arms one of which is arranged to engage with one of said jaws, and a member in engagement with the other arm of each of said levers, and longitudinally movable within the chuck, whereby said jaws may be caused to move radially and in unison, said jaws coöperating with the member-engaging arm of each of said levers to positively limit the swinging movement thereof in one direction, and said member coöperating with the chuck body to positively limit the swinging movement of each of said levers in the opposite direction, substantially as described.

HERMAN A. SCHULTZ.

Witnesses:
R. HANNIFIN,
M. J. HANNIFIN.